United States Patent [19]

Michling

[11] 4,304,152
[45] Dec. 8, 1981

[54] POWER AND TORQUE BRANCHING IN A PLANETARY GEAR SYSTEM

[75] Inventor: Wilhelm Michling, Hattingen, Fed. Rep. of Germany

[73] Assignee: Mannesmann Aktiengesellschaft, Duesseldorf, Fed. Rep. of Germany

[21] Appl. No.: 76,544

[22] Filed: Sep. 18, 1979

[30] Foreign Application Priority Data

Sep. 21, 1978 [DE] Fed. Rep. of Germany ....... 2841330

[51] Int. Cl.³ ............................................ F16H 37/06
[52] U.S. Cl. ...................................... 74/705; 74/682
[58] Field of Search ........................... 74/705, 674, 682

[56] References Cited

U.S. PATENT DOCUMENTS

| 1,777,860 | 10/1930 | Sandherr | 74/705 |
| 2,761,332 | 9/1956 | Gray et al. | 74/674 |
| 2,871,726 | 2/1959 | Kamlukin | 74/674 X |
| 2,892,361 | 6/1959 | Miller | 74/682 |
| 3,021,729 | 2/1962 | Chambers | 74/682 X |
| 3,429,200 | 2/1969 | Green | 74/674 |
| 3,540,307 | 11/1970 | Schell | 74/674 X |
| 4,077,278 | 3/1978 | Combastet | 74/682 |

FOREIGN PATENT DOCUMENTS

| 2618882 | 11/1977 | Fed. Rep. of Germany . | |
| 58643 | 3/1954 | France | 74/674 |
| 1222624 | 6/1960 | France | 74/674 |

Primary Examiner—Leslie Braun
Attorney, Agent, or Firm—Smyth, Pavitt, Siegemund & Martella

[57] ABSTRACT

The planetary gear system includes two parallel operating planet gears interposed between an input and an output shaft, with a common planet gear carrier secured to the output shaft and two telescoped intermediate shafts for the sun gears. These intermediate shafts are resiliently mounted for radial balance while a particular gear coupling between the input shaft and the two intermediate shafts ensures torsional balance between the two branches. This branch coupling, providing torsional balance, is described in considerable detail.

8 Claims, 2 Drawing Figures (A-B)

POWER AND TORQUE BRANCHING IN A PLANETARY GEAR SYSTEM

BACKGROUND OF THE INVENTION

The present invention relates to power-branched gears, including two planet gears, one per branch.

Power branching in speed reduction gearing is known to include two planet gears, a common drive shaft, and a common driven shaft. The power and torque to be transmitted between these two shafts is branched in order to reduce the size of the gears involved. The German printed patent application No. 26 18 882 describes an example for such a gear. The two branches are recombined in that both planet gear carriers are connected to the output shaft. This publication, moreover, describes a particular way to compensate or balance any torsional load differences in the two branches. It suggests providing the two planet gears with oppositely oriented helical teeth. Moreover, the two planet gear carriers (Spiders) are interconnected as well as connected to the output shaft by means of dua-larticulated joint or universal couplings. Radial loads are balanced as between the two branches by means of the radial mobility of the input shaft which carries the two sun gears. Radial load balance and torsional load balance are, thus, mutually dependent upon each other. This operational condition brings forth considerable requirements with regard to the accuracy of the teeth; in particular, if the balancing is also to be obtained upon reversing the direction of rotation! Moreover, helical teeth are required in this system which produces axial forces, and these have to be taken up separately.

DESCRIPTION OF THE INVENTION

It is an object of the present invention to provide a new and improved system for branching rotational power to be transmitted between an input and an output shaft under conditions of mutual independance of radial load balancing on one hand and torsional load balancing on the other hand, whereby particularly the construction as a whole is simplified over the prior systems.

In accordance with the preferred embodiment of the invention, it is suggested to provide two axially spaced planet gears with interconnected, preferably integral planet gear carriers being connected to and driving an output shaft and carrying planet gears which mesh in internal ring gears in a housing and are driven by two axially spaced sun gears. These two sun gears sit, respectively, on one end of an intermediate shaft and of a second intermediate but hollow shaft receiving the first mentioned intermediate shaft and being resiliently mounted thereon, while the first mentioned intermediate shaft is resiliently journalled at suitable locations. The two intermediate shafts carry coaxial coupling gears at their other ends which, respectively, mesh with other, axially offset coupling gears which, in turn, mesh with each other in pairs (there being at least one pair accordingly). These other coupling gears are journalled on a cage which is connected to and driven by the input shaft.

By means of this construction, radial load balancing is separated from torsional load balancing, the latter is carried out by and in the particular coupling structure while radial load balancing occurs on account of the resilient mounting of the two intermediate shafts. Any axial load balancing is carried out in the planet gears as is usual. Use of straight gears reduces the need for such a balancing.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which

Proceeding now to the detailed description of the drawings, FIG. 1 shows a planet gear system which includes two planet gears, 1 and 2, being in coaxial arrangement disposed in a housing, or casing, 24. This housing includes a cylindrical portion 25, a tubular extension 27, and covers 26 and 28 respectively for the two axial ends. All these parts are bolted to each other.

Figure 1:
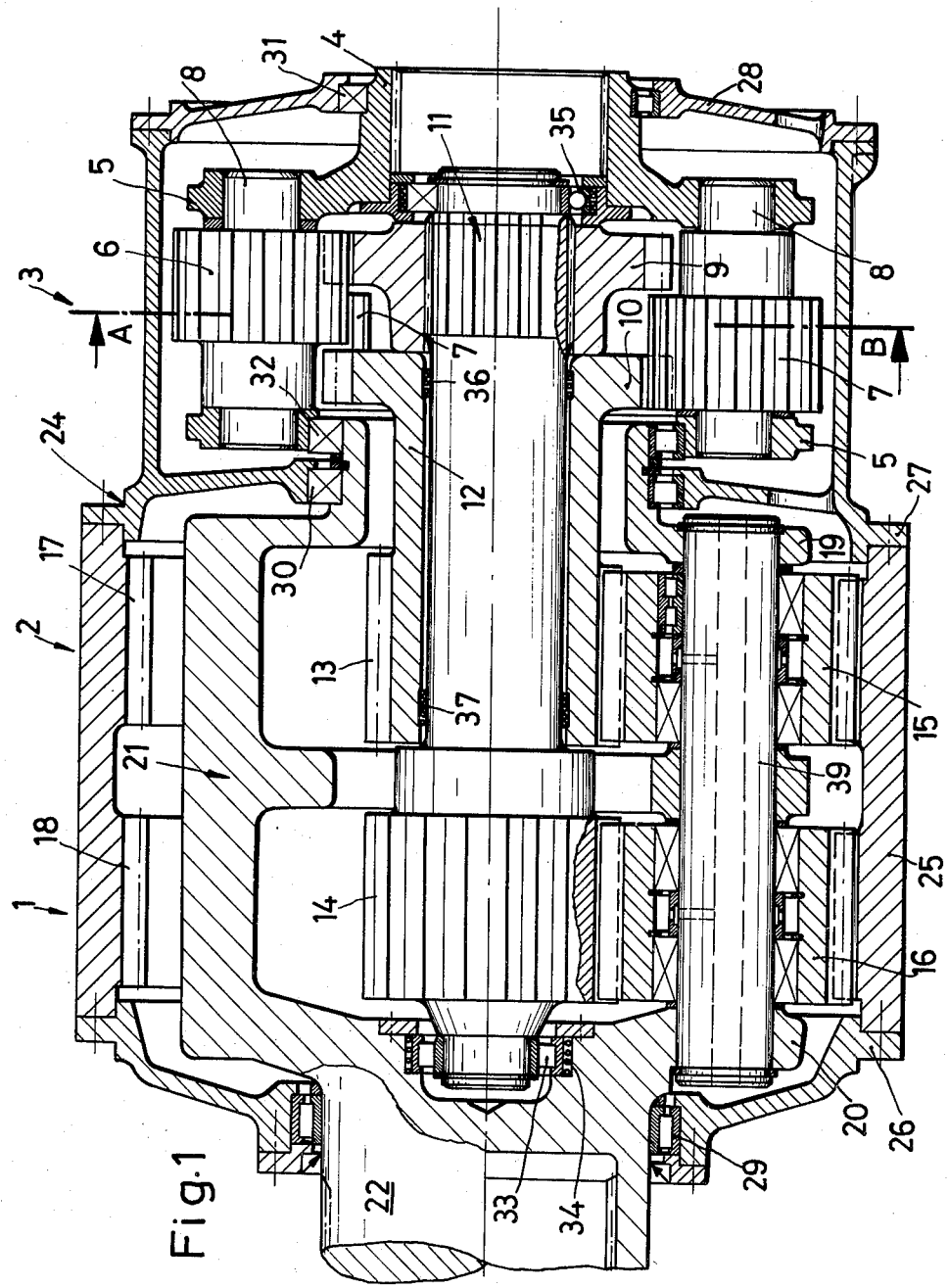
FIG. 1 is a section view into a planetary gear constructed in accordance with the preferred embodiment of the invention.

Axially in line with these gears but housed in extension 27 are a coupling 3 and a cage 5, being of a construction which resembles a planet gear spider or carrier. Cage 5 is integral with a hollow shaft 4 which constitutes the drive input for this gear assembly. The output shaft of that assembly is designated by reference numeral 22. Input and output shafts respectively traverse coaxially the two end covers 28 and 26.

Figure 2:
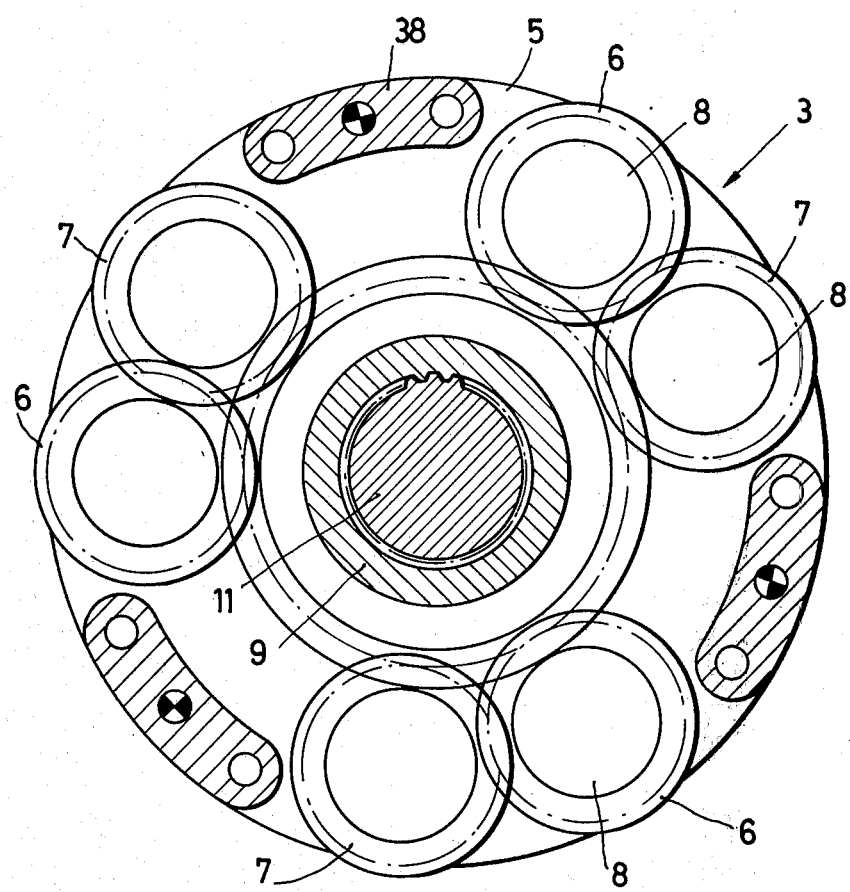
FIG. 2 is a section view taken in a plane indicated by A-B in FIG. 1.

Gears 6 and 7 of coupling 3 are journalled in or on cage 5 by means of pins 8. As one can see best from FIG. 2, there are provided three gears 6 and three gears 7; as shown in FIG. 1, the group of gears 6 is axially displaced with respect to the gears 7, but the axial offset is less than the (combined) axial lengths of the gears so that they overlap. Thus, each one of the gears 6 meshes with one of the gears 7. The elements 38 connect and mutually support the parts of which cage 5 is made. These gears 6 and 7 constitute the input portion of coupling 3. The output portion will be described shortly.

Turning now to the details of the planet gear system, the two planet gears 1 and 2 include, respectively, axially spaced sun gears 13 and 14; gear 2 includes planet gears 15, which are journalled on a carrier or spider 19; and gear 1 includes planet gears 16, which are journalled on a carrier or spider 20. These parts of the two gears together are combined in a common carrier element 21 which, furthermore, is connected to driven shaft 22. Strictly speaking, planet gear carriers 19 and 20 are just connected to each other and to output shaft 22. In reality, the two carriers 19 and 20 are of integral construction (21).

The two planet gears are completed by internal ring gears 17 and 18, meshing respectively with the planet gears 15 and 16. Though pertaining to different gears, the planet gears 15 and 16 are journalled in pairs on common pins 39. These pins are individually supported centrally (excentrically, of course, to the common system's axis) by and in the common carrier cage 21.

The planet carrier unit 21 is journalled in housing 24 by means of bearings 29 and 30, whereby particularly bearings 29 constitute the shaft bearings for shaft 22 in cover 26, and bearings 30 journal the other end of carrier 21 to an inside flange of extension 27.

As far as cage 5 is concerned, it is journalled to the housing, generally by being journalled to cover 28 by means of bearings 31, which constitute also the bearings for input shaft 4. In addition, cage 5 is journalled on carrier part 19 of carrier 21, amounting to a second but indirect journalling of cage 5 in housing 24, namely via bearings 30 being juxtaposed to bearings 32.

The system includes the two intermediate shafts 11 and 12, whereby the former is received in the latter, shaft 12 being a hollow shaft accordingly. It will be recalled that shaft 11 carries sunwheel 14 of planet gear 1, and shaft 12 carries sunwheel 13 of gear 2. Shaft 11 is longer on both ends than shaft 12 and projects therefrom accordingly. This permits the two shafts 11 and 12 to carry sunwheels 13 and 14 in axial alignment but with the requisite spacing. As to the other end, shaft 11 extends into hollow shaft 4. Two gears, 9 and 10, are mounted to the drive-side ends of shafts 11 and 12; they are also axially arranged, one behind the other, accordingly. Moreover, they mesh respectively with the axially offset gears 6 and 7 (9 with 6, 10 with 7) to complete the coupling.

Even though each one of gears 6 and 7 is journalled on cage 5, rotation of cage 5 will not cause gears 6 and 7 to roll onto gears 9 and 10. Rather, the mutual engagement of gears 6 and 7 in pairs causes each system (6 and 7) to respectively drive gears 9 and 10, thereby causing shafts 11 and 12 to rotate in unison. If, however, a torsional load imbalance occurs in the two branches, gears 6 and 7, meshing in pairs, rotate in compensating fashion to restore torsional balance. Thus, these coupling gears mutually hold and support each other dynamically to thereby balance the forces acting on gears 9 and 10!.

The two intermediate shafts are journalled in resilient bearings. In particular, shaft 11 has one end journalled in carrier 20, right at output shaft 22, by means of elastic bearings 33, which is itself mounted by means of resilient elements 34. These elements 34 circumscribe bearings 33 and are positioned in an annulus in the end region of shaft 22. The other end of shaft 11 is mounted in shaft 4 by means of bearings 35 which are likewise resiliently positioned in shaft 4. Thus, shaft 11 is resiliently mounted generally, and only indirectly to the housing.

The intermediate shaft 12 is also resiliently mounted, namely on shaft 11, and by means of resilient O-rings 36 ad 37. Except for a minor relative compensative turning, no permanent rotational movement exists as between shafts 11 and 12. It appears, therefore, that the two intermediate shafts are both mounted to permit resilient radial movement against each other and in relation to the housing and the other parts, if such temporary displacement is needed for reasons of radial balance.

It can, thus, be seen that the two axially juxtaposed sun gears 13 and 14 are respectively driven by two intermediate shafts, namely shafts 11 and 12. Still, the two sun gears have similar gearing and the same diameter. For the purpose of providing ab initio conditions for equal power transfer in both branches. Moreover, one places the compensation for any relative turning out of the planet gears and into the coupling portion (3) of the system. Torsional balancing is thus removed from the location of maintaining radial balance and does not interfere therewith, nor is it interfered with either. The rotational (torsional) balance and compensation, as between the two branches, is carried out in the coupling structure (6, 7, etc.) by means of which the input shaft is coupled to the two intermediate shafts, 11 and 12. Axial load balancing still occurs in the planetary gears as is known, per se.

The gearing itself is constructed by means of straight gears everywhere in order to avoid axial forces which, in turn, permits the structure to be comparatively simple. The two interconnected planet gear spiders 19 and 20 are journalled directly in housing 24 which takes up any torque. This way, one avoids a movable connection as between output side spider 20 and shaft 22; and one makes sure that the heaviest parts of the gear, i.e., the two planet gear carriers, are positively supported. The integral construction of the two carriers 19 and 20 permits also a reduction in the axial spacing between the two gears 1 and 2 as a whole.

It should be mentioned that one could use herringbone-type gearing in the planet gear in order to reduce the development of any noise, particularly for high RPM numbers. Of course, one will obtain some axial thrust if the two herringbone gears of the two sun gears are oppositely oriented. This axial thrust is readily taken up by correspondingly oriented herringbone gearing in the coupling structure. It is pointed out, however, that slow running gears are preferably provided with straight gears.

Another aspect is the fact that housing part 25 can be provided with the internal ring gears in integral construction.

The invention is not limited to the embodiment described above, but all changes and modifications thereof not constituting departures from the spirit and scope of the invention are intended to be included.

I claim:

1. Power branching and recombining planetary gear system to be interposed between a drive and input shaft and a driven and output shaft, comprising housing means;

a first, intermediate shaft, resiliently journalled at two axially spaced points in the housing means;

a second hollow intermediate shaft, concentrically receiving the first intermediate shaft, the first intermediate shaft projecting from the second, hollow intermediate shaft at both ends thereof, there being two axially spaced resilient means for supporting the second on the first shafts;

a first and second sun gear, respectively connected to one end each of the first and second shafts;

a first and a second planet gear carrier, being interconnected for common rotation and being further connected to the driven and output shaft for driving same, the gear carriers carrying planet gears respectively driven by the first and second sun gears;

first and second internal ring gears in the housing means and meshing respectively with the planet gears on the first and second planet gear carriers;

first and second axially spaced and coaxial coupling gears on the respective other ends of the first and second intermediate shafts;

at least one third coupling gear and at least one fourth coupling gear, azimuthally offset to each other but meshing each other, and being axially offset to also mesh respectively the first and second coaxial coupling gears; and a cage journalled in said housing means for journalling the third and fourth coupling gears so that the third and fourth coupling gears revolve about said axis, said cage being connected to and driven by the drive and input shaft.

2. System as in claim 1, wherein all gears are straight gears.

3. System as in claim 1, including a plurality of third coupling gears and a plurality of fourth coupling gears, meshing each other in pairs.

4. System as in claim 1, wherein the two planet gear carriers are of unitary construction.

5. System as in claim 1 or 4, wherein the planet gears carriers together are journalled in the housing means by two axially spaced bearings.

6. System as in claim 5, said cage being journalled on one of the planet gear carriers and on the housing means.

7. In a power branching system which includes two parallelly operated planet gear sets in a housing, the planet gears each having a sun gear, the improvement of connecting the sun gears to an input shaft, comprising:

a cage journalled in the housing and being connected to the input shaft;

a first and a second plurality of gears, journalled on the cage element about the axis of the input shaft, the gears of the first and second plurality mesh in pairs for mutual support, and they are axially offset by less than their axial extension;

a first intermediate shaft, carrying one of the sung gears at one end and carrying a first gear at its other end, meshing the gears of the first plurality; and a second, hollow intermediate shaft coaxially receiving the first intermediate shaft, carrying the second sun gear on one end as well as a second gear on its other end meshing with the gears of the second plurality, so that upon rotation of the cage both intermediate shafts are driven in unison, permitting relative rotation only for restoring or maintaining torsional balance.

8. In a system as in claim 7, said shafts being resiliently supported in order to permit independantly maintaining of radial balance.

* * * * *